Sept. 4, 1962 W. V. McKENZIE 3,052,393
TAKE-OFF MECHANISM
Filed Feb. 2, 1959 2 Sheets-Sheet 1
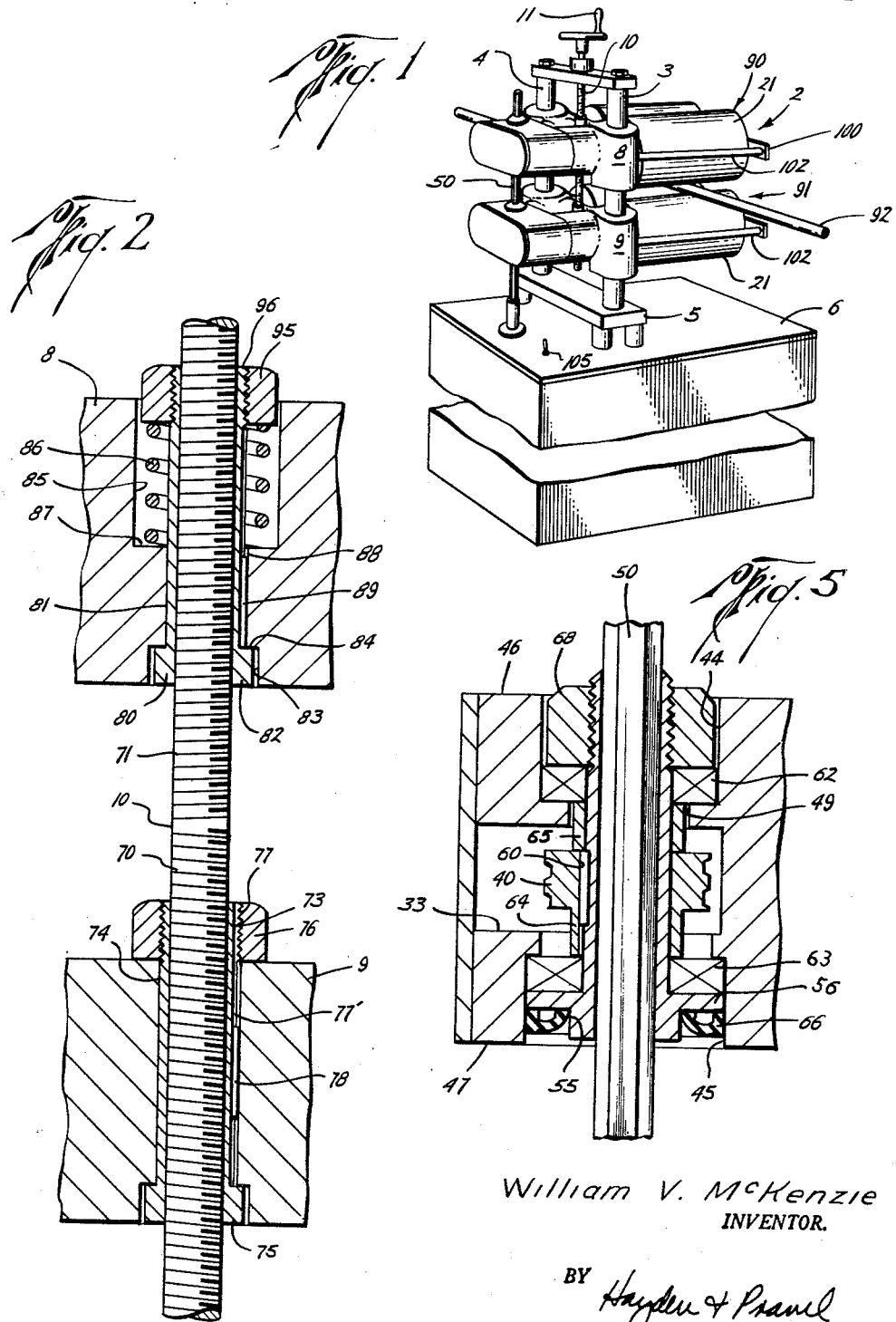
William V. McKenzie
INVENTOR.
BY Hayden & Pravel
ATTORNEYS

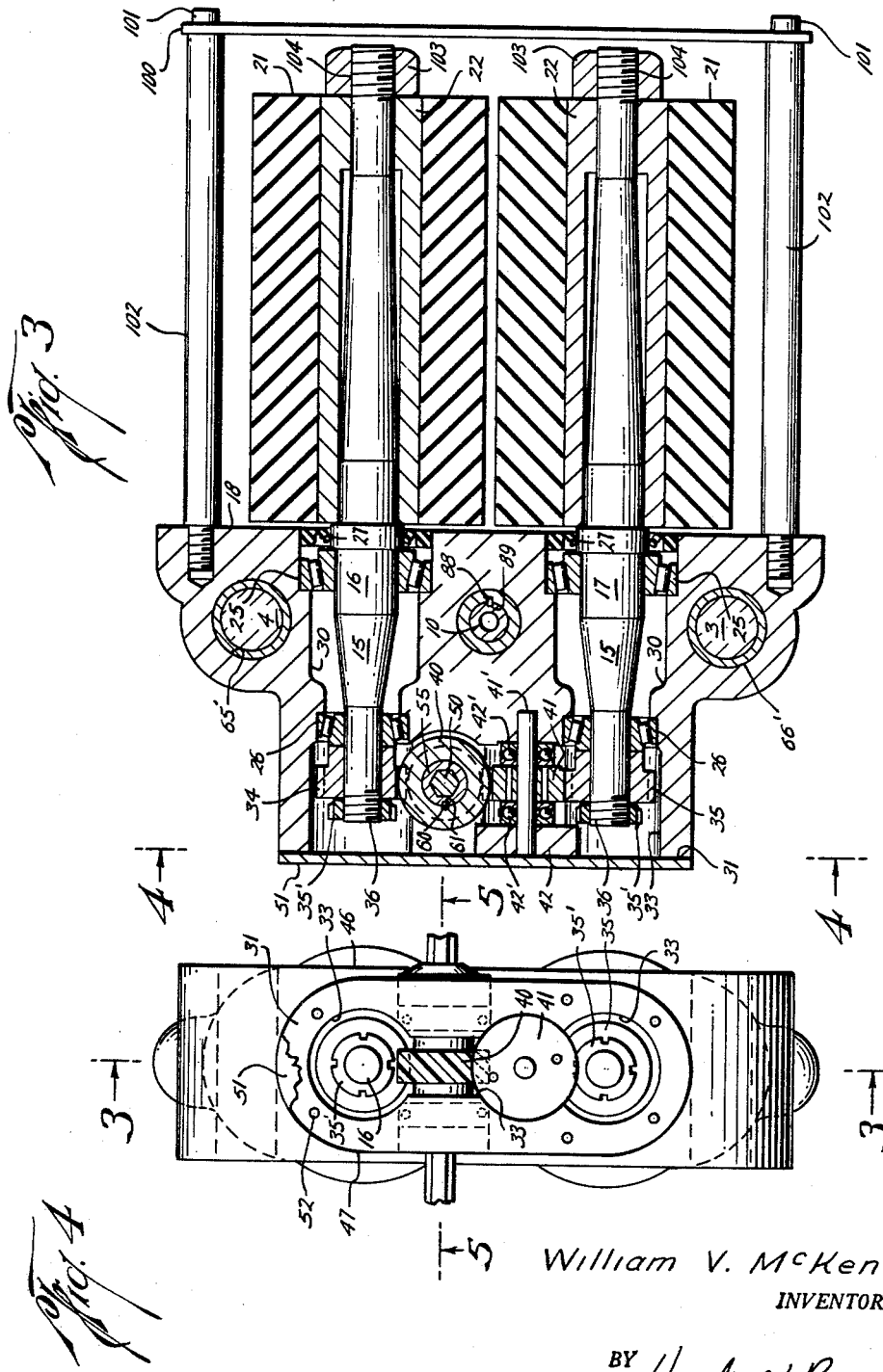

United States Patent Office 3,052,393
Patented Sept. 4, 1962

3,052,393
TAKE-OFF MECHANISM
William V. McKenzie, 2110 1st St., Galena Park, Tex.
Filed Feb. 2, 1959, Ser. No. 790,668
6 Claims. (Cl. 226—177)

The present invention relates to a take-off mechanism for extruding machines, and particularly to a take-off construction which is suitable for use with plastic extruders.

At the present time, a great deal of difficulty is encountered in providing a suitable construction for receiving plastic products from extruders. Material used to form the product by the extruder may vary from an extremely soft material to a relatively rigid material. The type of plastic material increases the problem of providing a suitable take-off mechanism which can be used in all situations regardless of whether the material is a relatively soft plastic, or a relatively hard plastic. Also, the problem of providing a suitable take-off mechanism for plastic extruders is further complicated because of the infinite shape of products formed by the extruders. For example, refrigerator or weather seals may be formed by an extruder, and the same extruder can be used to form tubing, chicken troughs, or filament, and any other products of infinite shape and size.

To function satisfactorily, any take-off mechanism used with a plastic extruder must be capable of not only satisfactorily receiving and supporting any type of plastic material from the very softest to the very hardest, but it must also be constructed and arranged so that it can receive, or can be modified to receive, any product regardless of its size and shape.

Also, take-off mechanisms suitable for use with plastic extrusion machines should be adaptable to operate at any speed to conform with the rate at which the material is discharged from the extrusion machine.

The present invention provides a take-off mechanism of relatively simple design, yet one which overcomes all of the objections above named, and other objections presently encountered with take-off mechanisms used with plastic extrusion machines.

Still another object of the present invention is to provide a take-off mechanism for a plastic extrusion machine which provides a substantial support area to plastic as it is discharged from plastic extrusion machines and exerts the proper tension thereon to aid in pulling the extrusion from the extrusion machine without damaging the extrusion, regardless of the type plastic used to form the extrusion.

Still another object of the present invention is to provide a take-off mechanism for a plastic extrusion machine which includes a support surface of substantial area for engaging plastic products as they are discharged from the extrusion machine, which take-off mechanism is constructed and arranged so that the support area engaging the plastic products as they are discharged from the machine may be driven at any desired rate to conform with the rate of discharge of plastic material from the extrusion machine.

Still a further object of the present invention is to provide a take-off mechanism including arbor means for supporting resilient rollers thereon, said take-off mechanism being constructed and arranged so that various types of resilient roller means may be quickly and easily positioned on the arbors, depending upon the size, shape and type of plastic used in the products formed by the plastic extrusion machine with which the take-off mechanism is used.

Still another object of the present invention is to provide a take-off mechanism which can be used with a plastic extrusion machine and which can be readily adjusted to accommodate plastic products from the extrusion machine of varying type, size and material.

Still another object of the present invention is to provide a take-off mechanism for use with plastic extrusion machines including paired housings supported on fixed vertically extending members, there being rotatable arbor means paired in each housing and vertically aligned with each other, said arbors being adapted to receive and support resilient members thereon and having gear means connected therewith whereby all of said arbors may be rotated so as to receive plastic material between the paired rollers of the housings as it is discharged from a plastic extrusion machine, and means supporting the paired housings on the fixed vertically extending shafts, which means is adapted to position the housings vertically relative to each other to space the resilient rotatable members on said arbors so that products of varying size may be received by the take-off mechanism.

Still another object of the present invention is to provide a take-off mechanism for use with plastic extrusion machines including paired housings supported on fixed vertically extending members, there being rotatable arbor means paired in each housing and vertically aligned with each other, said arbors being adapted to receive and support resilient members thereon and having gear means connected therewith whereby all of said arbors may be rotated so as to receive plastic material between the paired rollers of the housings as it is discharged from a plastic extrusion machine, and means supporting the paired housings on the fixed vertically extending shafts, which means is adapted to position the housings vertically relative to each other to space the resilient rotatable members on said arbors so that products of varying size may be received by the take-off mechanism, said last named means including a shaft which is threadedly connected with each of said housings so that when said shaft is rotated said housings will move toward and away from each other, and a spring support in one of said housings and abutting a projection on the threaded shaft whereby said one housing may move vertically an additional amount relative to the other housing.

Other objects and advantages of the present invention will become more readily apparent from a consideration of the following description and drawings, wherein:

FIG. 1 is an isometric view illustrating the present invention receiving a plastic tubing product between the paired upper and lower rollers;

FIG. 2 is an enlarged partial sectional view showing the shaft means which supports the housings relative to each other and on the fixed vertical shafts, which shaft also functions as a means for adjusting the housings vertically relative to each other;

FIG. 3 is a sectional view through one of the housings illustrating the arrangement of the arbor means and support means for the arbors in the housings, as well as the structural arrangement of the drive means for the arbors in the housings;

FIG. 4 is a view on the line 4—4 of FIG. 3 to further illustrate the arrangement of the arbors in the housing and to show further details of the drive shaft and its manner of mounting in each of the housings; and FIG. 5 is a sectional view on the line 5—5 of FIG. 4 and illustrates in more detail, the structural support and arrangement of the drive shaft in the housings.

In FIG. 1 the invention is illustrated generally by the numeral 2 and is shown as including the fixed vertically extending support members 3 and 4 which are spaced relative to each other. The support members 3 and 4 are mounted upon the base 5, which in FIG. 1 is shown as being in turn carried by the housing 6 in which the power mechanism for operating the invention is carried. The support members 3 and 4 may be interconnected by a brace at their upper ends as shown in FIG. 1. It can be appreciated that any suitable form of power can be supplied to operate the device, and that form as illustrated in FIG. 1 is for purpose of illustration only. The invention may be built and sold separately from the power unit 6, and any suitable power unit provided, as desired.

Housings 8 and 9 are carried by each of the shafts 3 and 4, which housings 8 and 9 are spaced relative to each other and supported on the shaft illustrated at 10. A hand wheel 11 is connected to the shaft 10 and by rotation of the shaft 10, the housings 8 and 9 may be simultaneously moved toward and away from each other vertically, to vary the distance therebetween, so as to receive plastic products of different size, as required, all as explained in detail hereinafter.

Each of the housings 8 and 9 are provided with paired arbor means illustrated generally by the numerals 15 in FIG. 3, which arbor means includes the paired arbors 16 and 17 mounted in each housing 8 and 9, and which arbors extend laterally toward the front 18 of each of the housings 8 and 9 as shown in FIGS. 1 and 3 of the drawings, and provide a means for receiving the resilient roller means 21. The resilient rollers 21 may be mounted upon any suitable support such as the spool illustrated at 22 in order to support the rollers on the arbors 16 and 17 in each housing 18 and 19.

As previously mentioned, the housing 8 is provided with spaced paired arbors 16 and 17, and the housing 9 is also provided with spaced paired arbors 16 and 17 in a manner similar to that illustrated in FIG. 3 of the drawings. The arbors 17 of the housings 8 and 9 are vertically aligned relative to each other, and the arbors 16 of the housings 8 and 9 are vertically aligned relative to each other, so that when the members 21 are positioned upon their respective arbors, they are aligned as above noted, and as illustrated in FIG. 1 of the drawings.

Each of the arbors 16 and 17 in each of the housings 8 and 9 is rotatably supported by suitable means such as that illustrated in FIG. 3 of the drawings. To this end, bearings 25 are provided adjacent the forward end 18 of each of the housings 8 and 9, and bearings 26 are spaced rearwardly therefrom and in each of the housings 8 and 9 so that each of the arbors 16 and 17 in each of the housings 8 and 9 are supported for rotation. If desired, suitable oil seals as illustrated at 27 may be provided to inhibit leakage of lubricant from the bearings and rotatable arbors supported in the housings 8 and 9.

It will be noted that, as illustrated in the drawings, the housings 8 and 9 are shown as being each integrally formed, and the arbors 16 and 17 are arranged in the bores 30, which bores extend from the forward end 18 to the rear end 31 of each of the housings 8 and 9. The bearings 25 and 26 are seated upon suitable shoulders formed by counterbores in the bores 30, as illustrated in FIG. 3 of the drawings.

The rear portion of each housing 8 and 9 is cut out as illustrated at 33 to define a suitable recess for receiving the gears 34 and 35, which are mounted on each of the arbors 16 and 17 respectively in each of the housings 8 and 9. The gears 34 and 35 are retained in position on the arbors by means of the nuts 35' which are engaged with the threaded ends 36 on each of the arbors 16 and 17 in each of the housings 8 and 9. The cut-out 33 is further provided for receiving the drive gear 40 and the idler gear 41, as well as its bearing or support 42.

Additionally, each of the housings 8 and 9 is provided with a bore 44 and 45, which extends from the top surface 46 and bottom surface 47 of each housing 8 and 9, as more clearly illustrated in FIGS. 4 and 5 of the drawings. An opening 49 extends through each of the housings 8 and 9 and communicates the bores 44 and 45, whereby the drive shaft illustrated at 50 may be received and connected through each of the housings 8 and 9 for driving the arbors 16 and 17 in each of the housings 8 and 9, as will be described in more detail hereinafter. A cover plate 51 is adapted to be secured to the rear end 31 of the housing by suitable means such as bolts (not shown) which may be secured in the threaded openings 52 spaced on the rear 31 of each of the housings 8 and 9, as shown in FIGS. 4 and 5 of the drawings.

It will be noted that the drive shaft 50 is noncircular in configuration, so that when it is rotated by power from power source 6, rotation may be imparted to the housing 55 which forms a sliding, but nonrotatable fit with the drive shaft 50. The shaft 50 is fixed relative to housings 8 and 9 and the housings 8 and 9 may be moved vertically relative to each other and relative to shaft 50. The housing 55 enables the housings 8 and 9 to be adjusted relative to shaft 50, and also effect transmission of power from shaft 50. The housing 55 extends through each of the bores 44 and 45 and is provided with an annular shoulder as shown at 56 for seating it within one of the bores, as shown in FIG. 5 of the drawings. The drive gear 40 is provided with a keyway 60 which fits in key 61 on the housing 55 that fits about the drive shaft 50. This is illustrated in FIG. 3 of the drawings.

Rotatable bearing means 62 and 63 are provided in each bore 44 and 45 of each housing 8 and 9, respectively. The drive gear 40 is provided with an extension integrally formed therewith on one side as shown at 64, and is provided with a spacer 65 on the other side so as to position the drive gear 40 properly on the housing 55 and in the cut-out 33, as shown in FIGS. 4 and 5 of the drawings. A suitable oil seal as illustrated at 66 is provided for inhibiting the loss of lubricant from the bearings and rotatable members in the bores 44 and 45 in each of the housings 8 and 9.

In positioning the housings 8 and 9 on the fixed shafts 3 and 4, the openings 65' and 66' are vertically aligned with the fixed supports 4 and 3 respectively, as shown in FIG. 3 of the drawings. Housing 9 would be first positioned on the supports 3 and 4, and thereafter housing 8 will be positioned on the shafts so that they will assume the relative relationship as shown in FIG. 1 of the drawings. At the time that the housings 8 and 9 are positioned on each of the fixed shafts, they are also positioned on the fixed upwardly extending drive shaft 50.

The drive shaft 50 is adapted to extend through the bores 44, 45 and 49 of each of the housings 8 and 9 as previously described. As previously noted, the inner housing 55 is provided with an annular shoulder 56 to seat in the bore 45 as noted in FIG. 5 and the bore of the housing is noncircular to conform with the noncircular drive shaft 50. Therefore, to position the drive shaft 50 and housings 8 and 9 together, the inner housing 55 and the drive gear 40 may be first assembled by sliding the gear 40 over 55 to engage keyway 60 of the gear and key 61 of the housing. This locks housing 55 and drive gear 40 together. Extension 64 and spacer 65 position the drive gear 40 properly on housing 55 so that the gear 40 will fit properly in cut-out 33 when housing 55 extends through bores 44, 45 and 49 of each housing 8 and 9. The bearing 63 is seated on the inner housing 55, and the inner housing 55, and supported drive gear 40, bearing 63 which abuts the annular shoulder 56 may be thereupon inserted through the lower enlarged part of communicating bore 49 of its respective housing 8 and 9. The inner housing 55 will thereby extend through the bores 44 and 45 of each housing 8 and 9 prior to the time that the shaft 50 is inserted through the housings 8 and 9.

As the housing 9 is lowered on the vertically fixed support shafts 3 and 4, the shaft 50 will slide along the bore of the noncircular inner housing 55, since the bore of the inner housing is shaped on its periphery to form a sliding, but nonrotatable fit with the drive shaft 50. When the housing 9 has assumed the desired vertical position on the shafts 3 and 4, the bearing 62 may be then inserted through the opening 44, which extends into the housing 9 from the top surface 46 of the housing. Thereafter, the nut 68 may be threadedly engaged on the threaded portion of the inner housing 55 so as to abut the bearing race 62 as illustrated in FIG. 5 of the drawings. When thus assembled, the shaft 50 is rotatable relative to the housing 9 and the drive gear 40 is fixed to the shaft 50 by reason of the keyway and key connection 60 and 61 on the drive gear 40 and the inner housing 55 respectively, so that it rotates simultaneously with the drive shaft 50. The positioning of the inner housing 55, bearing race 63, drive gear 40, bearing race 62 and nut 68 for the housing 8 may be in like manner effected, and the positioning of housing 8 on the drive shaft 50 and the supports 3 and 4 may be in like manner effected.

In order to support the housings 8 and 9 on the shafts 3 and 4, as well as to accommodate vertical movement of the housings 8 and 9 along the shaft 50, and relative to each other, the shaft means illustrated at 10 is provided. It will be noted, as more clearly illustrated in FIG. 2 of the drawings that this shaft 10 includes a threaded portion 70 thereon which is threaded in a direction opposite to the threaded portion 71 thereon. The one threaded portion 70 is adapted to engage the collar 73 which extends through the opening 74 in the housing 9 and is seated in the housing 9 by reason of the annular projection 75 on one end of the collar 73. The collar 73 is held in position in the housing 9 by reason of the nut 76 engaging the threaded end 77 of the collar 73. In order that the housing 9 may be moved longitudinally relative to the shaft 10 and also relative to the housing 8 when shaft 10 is rotated, the collar 73 must be locked against rotational movement relative to the housing 9. In order to accomplish this, a keyway 77' may be provided in the bore 74, which keyway is adapted to receive the key 78 integrally formed on the collar 73. Thus, the collar 73 may be easily positioned in the bore 74 by inserting key 78 in keyway 77' of bore 74, and the shaft 10 then threaded therethrough. The nut 76 is threaded on the upper end of the collar 73 to hold it in position and in threaded engagement with the threads 70 of the shaft 10.

The portion 71 of the shaft 10 is threadedly engaged with the collar 80, which collar extends through the bore 81 and is provided with an enlarged head 82 that seats on the shoulder 84 formed by counterbore 83. The bore 81 is counterbored at its other end as illustrated at 85 to receive the spring 86 on the shoulder 87 formed at the termination of the counterbore 85. The collar 80 is held against rotational movement relative to the housing 8 by reason of the keyway 88 which extends longitudinally of the bore 81 and key 89 which is integrally formed on the collar 80 and fits within the keyway 88.

From the foregoing description, it can be appreciated that when the shaft 10 is rotated by the hand wheel 11 as shown in FIG. 1 of the drawings, the members 8 and 9 are moved simultaneously toward and away from each other along the shaft 10 on which they are threadedly supported so as to space the upper paired rollers designated generally at 90 in FIG. 1 relative to the lower paired rollers designated generally at 91 in FIG. 1 to receive plastic products of any suitable size therebetween, such as that illustrated at 92 in FIG. 1. If the operator of the device should accidentally have his arm engaged between the paired upper and lower rollers 90 and 91, the upper housing 8 is adapted to yield an additional amount relative to the housing 9. To accomplish this, the spring 86 is provided which rests on the shoulder 87 at one end of the counterbore 85 and abuts the nut 95 at its other end. The nut 95 is threaded on the end 96 of the collar 80, as shown in FIG. 1 of the drawings. If a larger object, such as the operator's arm, or any other foreign object becomes engaged between the paired upper and lower rollers 90 and 91, which object is larger than the amount of spacing determined by the position of the housings 8 and 9 on the shaft 10, then the housing 8 will move upwardly against the tension in spring 86 by reason of the longitudinal sliding arrangement of the key 89 in keyway 88. After the larger object has been disengaged from the rollers, the housing 8 will assume its initial position relative to the housing 9 on the shaft 10, since the spring 86 tends to return the rollers to their normal adjusted position.

It is believed that the construction and operation of the invention is apparent by reason of the foregoing, and the present invention may be used with any suitable power mechanism such as illustrated at 6, which in turn is connected to the power shaft 50 for imparting rotation to the shaft. When the shaft 50 is rotated, the drive gear 40 is rotated, and this drive gear is, in turn engaged with the gear 34 on each of the arbors 16 in each of the housings 8 and 9. It is also engaged with each of the idler gears 41 in each of the housings 8 and 9 which thereby connects the gear 35 on each of the arbors 17 in each of the housings 8 and 9 directly to the drive shaft 50 so that all four arbor shafts of the mechanism are rotated or driven simultaneously. Furthermore, the shafts in each housing are rotated in the same direction as the direction of discharge of the plastic product from the plastic extruding machine.

The speed of the shaft 50 can be varied from a maximum to a minimum, depending upon the power supply from the power mechanism 6, and this, in turn, enables the upper paired rollers and the lower paired rollers 91 to be rotated simultaneously at any speed from a minimum to a maximum, in order that a desired speed of the rollers may be maintained to engage and support the plastic discharged from the plastic extruding machine, regardless of the rate of discharge of the plastic material from the plastic extruding machine.

It will be further noted that the bearing supports 25 and 26 for each of the arbors 16 and 17 in each of the housings 8 and 9 is spaced so that proper support for the resilient roller members 21 mounted on the arbors is provided. Such bearing arrangement and support inhibits wobbling of the members 21, and provides a means for ready access to the members 21 so that they can be quickly and easily dismounted and rollers of different configuration, size or shape positioned on each of the arbors 16 and 17 of each of the housings 8 and 9. To accomplish this, it is only necessary that the bar 100 be removed by first disconnecting the retaining nuts 101 which are threadedly engaged on the forwardly extending bars 102 of each of the housings 8 and 9. After the nuts 101 have been disconnected, the bar 100 may be easily slipped off so that the nuts 103 which are threadedly engaged as illustrated at 104 on the ends of each of the arbors 16 and 17 may be disengaged so that the members 21 and their support spools integrally formed therewith may be removed from the arbors.

Under some circumstances it may be desirable to use a roller or rollers having grooves cut therein, depending upon the configuration of the plastic product being discharged from the plastic extruding machine. Rollers of other configuration could be used with the present invention, depending upon the type of plastic, the type and size and shape of the product being formed by the plastic extruding machine.

From the foregoing it can be readily appreciated that the present invention provides a take-off mechanism for use with a plastic extrusion device, wherein the size and shape and configuration of the rollers to be used as the support surface for the plastic discharge from the plastic extrusion machine may be changed with a minimum of effort. Not only may the rollers be changed with a minimum of effort, but their structural arrangement and support within each of the housings 8 and 9 is such that wobbling of the rollers, regardless of size or configuration is inhibited, if not completely eliminated, even after an extended period of use.

Quite often it is necessary to use unskilled labor in connection with the formation of plastic, and it can be readily appreciated that the simplicity of design of the present machine is such that anyone, regardless of skill may adjust it to accommodate the particular type and size of plastic product to be discharged from a plastic extrusion machine. Not only can the device be readily adjusted, but the speed of the device can be readily controlled by any suitable mechanism such as that illustrated at 105 for controlling the speed of the drive shaft 50.

It should be noted that the idler gear 41 is supported by the bearing plate 42 that is carried in the end of housings 8 and 9 and abuts against the closure plate 51, and is carried by means of the shaft 41' that is fixed in the plate 42 at one end of each of the housings 8 and 9 at its other end as shown, whereby the bearing races 42' may be provided for rotatably supporting the idler gear 41 relative to the shaft 41' and its bearing plate 42.

Attention is directed to the additional fact that the present invention provides a relatively large support area for engaging the plastic, in that paired arbors are provided in each housing 8 and 9 so that members 21 may be mounted on each of the arbors, if desired, to thereby engage the product being discharged from the plastic extrusion machine at two spaced intervals therealong. Under some circumstances, this may be extremely desirable to inhibit damage to the plastic product as it is being pulled from the plastic extrusion machine by engagement with the rollers of the present invention.

As previously noted, the present invention can be used with any suitable plastic extrusion machine, and may be positioned adjacent the discharge of the plastic extruder. As the plastic is discharged from the plastic extruder, it will be engaged between the rotating paired upper and lower rollers 90 and 91. The paired rollers 90 and 91 will be vertically positioned so as to accommodate the plastic regardless of its size, and will be positioned so as to exert a pull on the plastic to aid in discharging it from the plastic extruding machine. The speed of the rollers may be varied, as necessary, to accommodate the speed of extruding, and the size of the rollers, as well as their shape, may be quickly and easily changed, depending upon the product being extruded so as to engage the product with the proper tension to aid in discharging it from the extruder.

Broadly the invention relates to a take-off machine for plastic extruders, and more particularly to a take-off machine of improved design which overcomes the problems heretofore encountered with take-off machines used with plastic extruders.

What is claimed is:

1. A take-off mechanism for extruding machines including, opposed paired roller means, shaft means operatively connected to each of said rollers for rotating them, power means operatively connected to said shaft means for imparting rotation to said roller means, additional means connected between said opposed roller means to move said roller means toward and away from each other to adjust the vertical spacing between said roller means, and additional means to accommodate additional relative spacing of said opposed rollers, but tending to return said opposed rollers to their spacing as determined by said connected adjusting means.

2. A take-off mechanism for plastic extruding machines including spaced vertically extending support members, spaced housings supported for movement on each of said vertically extending supports, arbor means rotatably supported in each of said spaced housings and extending therefrom in opposed relation, rotatable shaft means extending between and threadedly connected to each of said spaced housings for movement of said housings whereby said arbor means in said housings may be positioned vertically relative to each other as desired, additional shaft means rotatably supported through said housings, said last named shaft means having gear means thereon in each of said housings, and said arbor means having gear means mounted thereon in each of said housings and operatively connected with said gear means on said additional shaft whereby rotation of said additional shaft effects rotation of said arbor means.

3. The combination recited in claim 2 wherein said first mentioned shaft means which is rotatably connected to each of said housings includes additional means having a spring to normally retain said arbors and housing in the relationship to which they are positioned by said above named shaft, but which is operable to accommodate additional relative vertical spacing of said housings and arbors supported thereon.

4. A take-off mechanism for plastic extruding machines including spaced vertically extending support members, spaced housings supported for movement on each of said vertically extending supports, arbor means rotatably supported in each of said spaced housings and extending therefrom in opposed relation, rotatable shaft means extending between and threadedly connected to each of said spaced housings for movement of said housings whereby said arbor means in said housings may be positioned vertically relative to each other as desired, additional shaft means rotatably supported through said housings, said last named shaft means having gear means thereon in each of said housings, said arbor means having gear means mounted thereon in each of said housings and operatively connected with said gear means on said last named shaft whereby rotation of said last named shaft effects rotation of said arbor means, said first mentioned shaft means connected to said housings including additional means having a spring to normally retain said arbors and housing in the relationship to which they are positioned by said above named shaft, but which is operable to accommodate additional relative vertical spacing of said housings and arbors supported thereon, and power means connected to said additional shaft means to effect rotation thereof.

5. A take-off mechanism for plastic extruding machines including spaced fixed vertically extending support members, spaced housings having vertically aligned openings to slidably receive said support members to position said housings on said members, shaft means extending through and threadedly connected to each of said housings whereby said housings may be adjusted vertically toward and away from each other, arbor means mounted on each of said housings, spaced roller bearing means supporting each of said arbors in each of said housings whereby said arbors may rotate relative to each other and relative to said housings in which they are mounted, said arbor means extending from each of said housings to support members thereon and in spaced opposed relation to each other, gear means mounted on each of said arbor means, a power shaft, and gear means mounted thereon and connected to said arbor gear means to effect rotation of said arbors when said power shaft is rotated.

6. The combination recited in claim 5 wherein said adjusting shaft means includes a spring supporting said shaft in one of said housings to accommodate relative vertical movement between said one housing and shaft and between said one housing and the other housing in opposed relation thereto.

References Cited in the file of this patent

UNITED STATES PATENTS

| | | |
|---|---|---|
| 2,032,260 | Chapman | Feb. 25, 1936 |
| 2,595,879 | Pasquier | May 6, 1952 |
| 2,751,069 | Goodman | June 19, 1956 |

FOREIGN PATENTS

| | | |
|---|---|---|
| 1,117,058 | Great Britain | May 16, 1956 |